US012112937B2

(12) United States Patent
Richter et al.

(10) Patent No.: US 12,112,937 B2
(45) Date of Patent: Oct. 8, 2024

(54) LIGHTING ELEMENT FOR A FIREARM OR SIGHT

(71) Applicant: mb-microtec ag, Niederwangen bei Bern (CH)

(72) Inventors: Karsten Richter, Bern (CH); Philipp Michel, Gümligen (CH)

(73) Assignee: mb-microtec ag, Niederwangen bei Bern (CH)

( * ) Notice: Subject to any disclaimer, the term of this patent is extended or adjusted under 35 U.S.C. 154(b) by 0 days.

(21) Appl. No.: 18/046,263

(22) Filed: Oct. 13, 2022

(65) Prior Publication Data

US 2024/0128073 A1 Apr. 18, 2024

(51) Int. Cl.

| | |
|---|---|
| ***H01J 61/30*** | (2006.01) |
| ***H01J 61/12*** | (2006.01) |
| *F41G 1/32* | (2006.01) |
| *G21H 3/02* | (2006.01) |

(52) U.S. Cl.

CPC ............ *H01J 61/302* (2013.01); *H01J 61/12* (2013.01); *F41G 1/32* (2013.01); *G21H 3/02* (2013.01)

(58) Field of Classification Search

CPC ........... H01J 61/302; H01J 61/12; F41G 1/32; G21H 3/02

See application file for complete search history.

(56) References Cited

U.S. PATENT DOCUMENTS

| | | | | |
|---|---|---|---|---|
| 6,310,737 | B1 | 10/2001 | Gillich et al. | |
| 2007/0091614 | A1* | 4/2007 | Kaisser | B60Q 3/14 362/326 |
| 2011/0107650 | A1 | 5/2011 | Howe et al. | |
| 2011/0249428 | A1 | 10/2011 | Profos | |
| 2017/0321992 | A1 | 11/2017 | Erdle | |
| 2018/0010886 | A1 | 1/2018 | Kind et al. | |
| 2018/0053575 | A1* | 2/2018 | Karchon | G21F 5/015 |
| 2018/0231350 | A1 | 8/2018 | Howe et al. | |
| 2022/0178650 | A1 | 6/2022 | Smith et al. | |
| 2022/0178651 | A1 | 6/2022 | Wyka | |

FOREIGN PATENT DOCUMENTS

| | | | |
|---|---|---|---|
| WO | 2016124686 | A1 | 8/2016 |
| WO | 2019209535 | A1 | 10/2019 |

* cited by examiner

*Primary Examiner* — Donald L Raleigh

(57) ABSTRACT

A lighting element for a firearm or sight with a gaseous tritium light source and with an injection-molded plastic housing, wherein the plastic housing at least partially encloses the gaseous tritium light source. High mechanical ruggedness can be achieved if the plastic housing at least partially consists of a polyamide 12 (PA12)-based or polycarbonate (PC)-based plastic.

19 Claims, 2 Drawing Sheets

LIGHTING ELEMENT FOR A FIREARM OR SIGHT

FIELD OF THE INVENTION

The invention relates to a lighting element for a firearm or sight with a gaseous tritium light source and with a—more particularly elongated—injection-molded plastic housing, wherein the plastic housing at least partially encloses the gaseous tritium light source.

BACKGROUND OF THE INVENTION

To improve night vision for sights of firearms, it is known (WO2016/124686) to use a lighting element with a gaseous tritium light source. Such a use of lighting elements with radioluminescent light sources is subject to stringent requirements with regard to the mechanical ruggedness thereof. For example, for the USA, these lighting elements must pass a NUREG test (NUREG 1556, Vol. 8, Rev. 1, Appendix D) in order to insure that under various conditions, the gaseous tritium light source cannot come loose from the sight or get damaged. The gaseous tritium light source is therefore partially enclosed by a plastic housing to protect it. Plastic does in fact perform well for mechanically protecting the gaseous tritium light source, but in firearms, this plastic must also withstand comparatively high temperatures and a wide variety of cleaning chemicals such as gun cleaning oils—namely while retaining its mechanical resilience.

The object of the invention, therefore, is to modify a lighting element of the type explained at the beginning in such a way that while achieving a high degree of mechanical ruggedness, whereby it can also ensure a comparatively high temperature resistance and chemical resistance. The lighting element should also be easy to produce.

SUMMARY OF THE INVENTION

If the plastic housing at least partially consists of a polyamide 12 (PA12)-based or polycarbonate (PC)-based plastic, then a high mechanical resilience can be combined with a high thermal and chemical resistance—which makes the lighting element according to the invention particularly outstanding when used in a firearm or in a sight for this firearm. Preferably, the plastic housing consists entirely of a polyamide 12 (PA12)-based or polycarbonate (PC)-based plastic. It can also be sufficient, however, if the plastic housing consists of a polyamide 12 (PA12)-based or polycarbonate (PC)-based plastic in a see-through region of the plastic housing.

Because of its respective special chemical polymer structure, the PA12 or PC plastic of the plastic housing can ensure a high temperature resistance, for example up to 120° C. (degrees Celsius), and high chemical resistance, for example relative to solvents for gun cleaning oils, and thus can also successfully pass the NUREG test (NUREG 1556, Vol. 8, Rev. 1, Appendix D).

In addition, according to the invention, plastics used in the plastic housing can easily be used for an injection molding process even with thin wall thicknesses of the plastic housing, which promotes a simple and inexpensive production of the lighting elements.

Preferably, the polyamide 12 (PA12) base is selected from the group PA 12/MACMI, PA MACMI/MACMT/12, or PA12 GF30 as well as mixtures or blends of one or more of these plastics.

Alternatively, it is also conceivable for the polycarbonate (PC) base to be selected from the "PC-HT" group as well as mixtures or blends of one or more of these plastics.

Preferably, the plastic housing is embodied as at least partially transparent in order to thus enable a defined light emission.

The foregoing can be further improved if a first end of the plastic housing forms an optical lens. This also makes it possible to further simplify the design of the lighting element.

Alternatively to a one-piece embodiment of the plastic housing and lens, it is conceivable for a first end of the plastic housing to have an optical lens, wherein the lens is injection molded onto the plastic housing by means of a 2-component injection molding process. It is also conceivable for the plastic housing to be injection molded onto the lens by means of a 2-component injection molding process.

Through the selection of the plastic according to the invention, a 2-component injection molding process can also be particularly suitable as a production process for the plastic housing. With these plastics, it is also possible to use them in a transparent form or in a colored form, which can allow them to be used universally.

If the lens is embodied as plano-convex, convex-convex, or concave-convex, then the light emission of the gaseous tritium light source can be concentrated better, and the brightness of the lighting element can be further increased by means of this focusing.

Preferably, an inner radius (R2) of the lens and an outer radius (R1) of the lens are different from each other.

For this purpose, it can be advantageous if the inner radius and/or the outer radius is/are in a range from 1.25 to 4 times half of the diameter of the gaseous tritium light source.

Preferably, the plastic has pigments. For example, the pigments may be color pigments, luminous pigments, fluorescent pigments, phosphorescent pigments, or any combination thereof, in order to further increase the brightness and thus the improved visual recognition in low light conditions.

If the gaseous tritium light source is integrally bonded to the plastic housing by means of a—more particularly white—adhesive, then this can further increase the ruggedness relative to mechanical stresses. In addition, a white adhesive can have an advantageous effect on the brightness of the lighting element.

The design of the lighting element can be further simplified if the gaseous tritium light source has a hermetically sealed, more particularly round, glass tube, more particularly made of borosilicate glass, as its outer shell.

A sight can have the lighting element according to the invention in order to further improve the visibility of the sight in low light conditions.

In addition, a firearm can have this sight or also the lighting element according to the invention in order to further improve the visibility of the firearm, a marking thereon, a part thereof, etc. in low light conditions.

BRIEF DESCRIPTION OF THE DRAWINGS

The subject matter of the invention is shown by way of example in the figures based on multiple embodiment variants. In the drawings.

DETAILED DESCRIPTION OF THE PREFERRED EMBODIMENTS

The lighting elements 1, 2, 3, 13 shown in FIGS. 1 to 4 all have a gaseous tritium light source 4, which is also known as a GTLS in the prior art. In the exemplary embodiments, this gaseous tritium light source 4 includes a hermetically sealed, round glass tube 4*a* made of borosilicate glass as its outer shell—wherein the glass tube 4*a* is coated on the inside with a luminophore such as zinc sulfide 4*b* and is filled with tritium 4*c*. In all of the lighting elements 1, 2, 3, 13, the gaseous tritium light source 4 is provided in an elongated plastic housing 5, 6, 7, 15, which at least partially encloses the gaseous tritium light source 4 with its housing shell 5*a*, 6*a*, 7*a* and thus protects it from damage. The gaseous tritium light source 4 is held in the plastic housings 5, 6, 7, 15—as shown in FIGS. 1, 2, 3, and 4.

Figure 1:
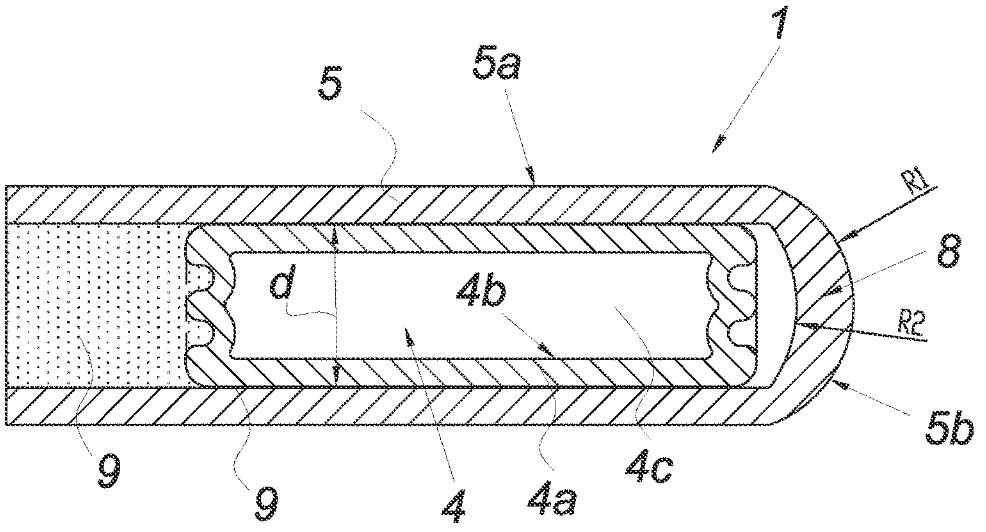
FIG. 1 shows a cross-sectional view of a lighting element according to a first exemplary embodiment.

The first plastic housing 5 of the lighting element 1 according to FIG. 1 is injection molded out of a transparent plastic based on polyamide 12 (PA12), namely PA 12/MACMI. It is also conceivable for the first plastic housing 5 to be injection molded out of a transparent PC-based plastic.

By means of the PA 12/MACMI plastic, the first plastic housing 5 can advantageously also integrally form a concave-convex optical lens 8, which significantly reduces the design complexity of the lighting element 1. The plastic can be PC-based.

The lens 8 adjoins a casing 5*a* of the first plastic housing 5 that is annular cross-section and in this example, forms the first end 5*b* of the plastic housing 5.

The integration of the optical lens 8 with freely selectable lens shapes into the first plastic housing 5, however, does not incur added costs of any consequence, for example, if this is carried by means of an injection-molded shaping. It is therefore possible to omit a cost-intensive, specially produced, shaped lens or sapphire used as an insert in the plastic housing.

As is clear from FIG. 1, the inner radius R2 of the lens 8 and the outer radius R1 of the lens 8 are different from each other.

In addition, the gaseous tritium light source 4 is integrally bonded to the first plastic housing 5 by means of a—more particularly white—adhesive 9 in order to thus increase the brightness of the lighting element 1 at the end 5*b* through reflection.

Figure 2:
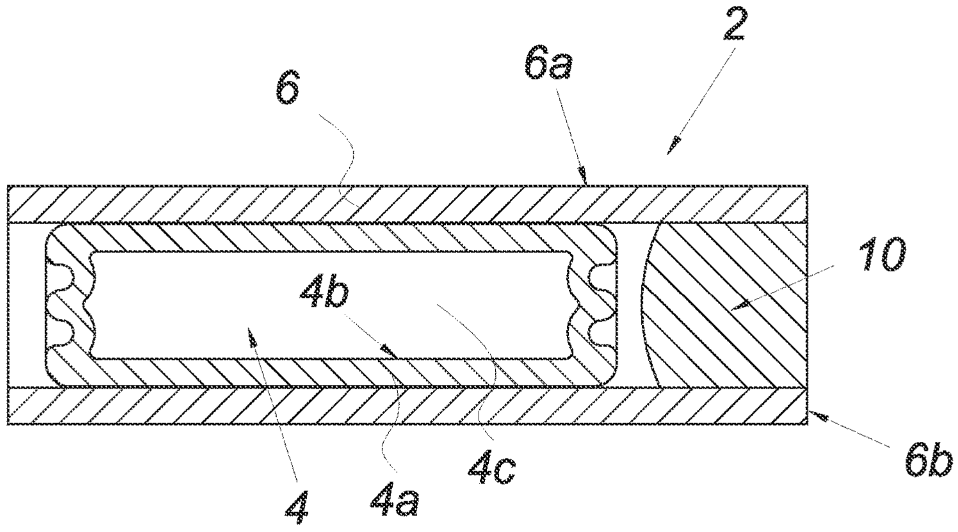
FIG. 2 shows a cross-sectional view of a lighting element according to a second exemplary embodiment.
Figure 3:
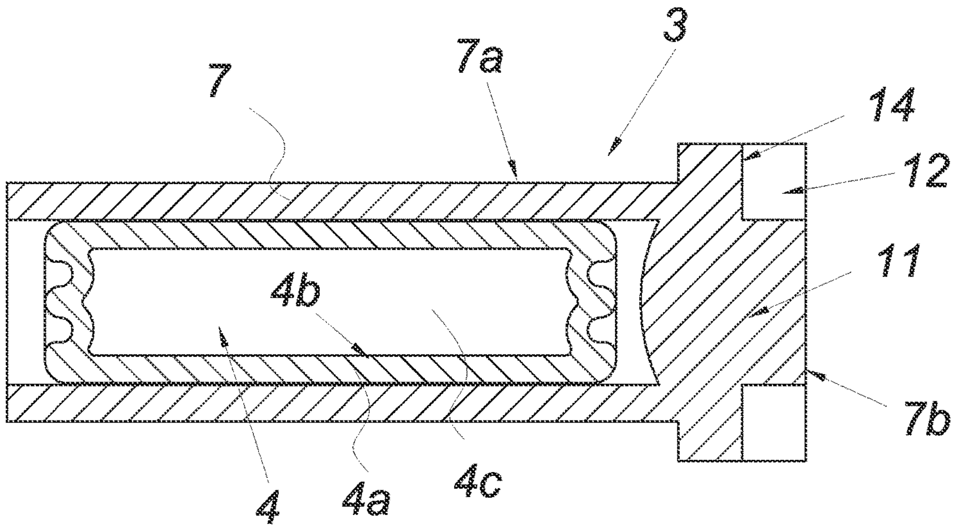
FIG. 3 shows a cross-sectional view of a lighting element according to a third exemplary embodiment.

FIGS. 2 and 3 show lighting elements 2 and 3 with a differently shaped plastic housing 6 and 7.

According to FIG. 2 the second plastic housing 6 is connected to a lens 10 onto which the second plastic housing 6 is injection molded. The second plastic housing 5 is injection molded of a transparent plastic based on polyamide 12 (PA12), namely PA 12/MACMI. It is also conceivable for the first plastic housing 5 to be injection molded of a transparent PC-based plastic. For example, the lens 10 is a sapphire.

In comparison to this, the third plastic housing 7 according to FIG. 3 forms a lens 11. This third plastic housing 7 also forms an outer flange 14 that adjoins this lens 11 and accommodates a daylight sight ring 12. The daylight sight ring 12 is an additional component in the 2-component injection molding process. This daylight sight ring 12 improves the visibility of the lighting element 3 in daylight.

The third plastic housing 5, which is another component in the 2-component injection molding process, is made of a transparent plastic based on polyamide 12 (PA12), namely PA 12/MACMI. It is also conceivable for a transparent PC-based plastic to be injection molded.

Figure 4:
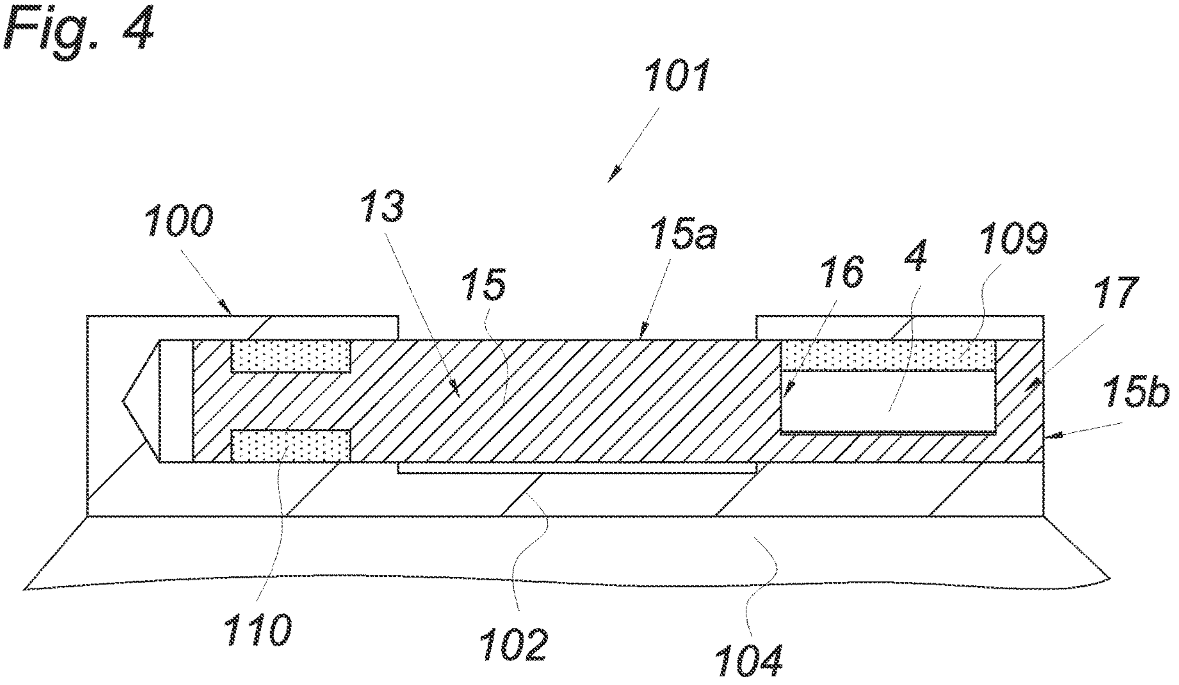
FIG. 4 shows a cross-sectional view of a partially depicted firearm with a sight, having a lighting element according to a fourth exemplary embodiment.
Figure 5:
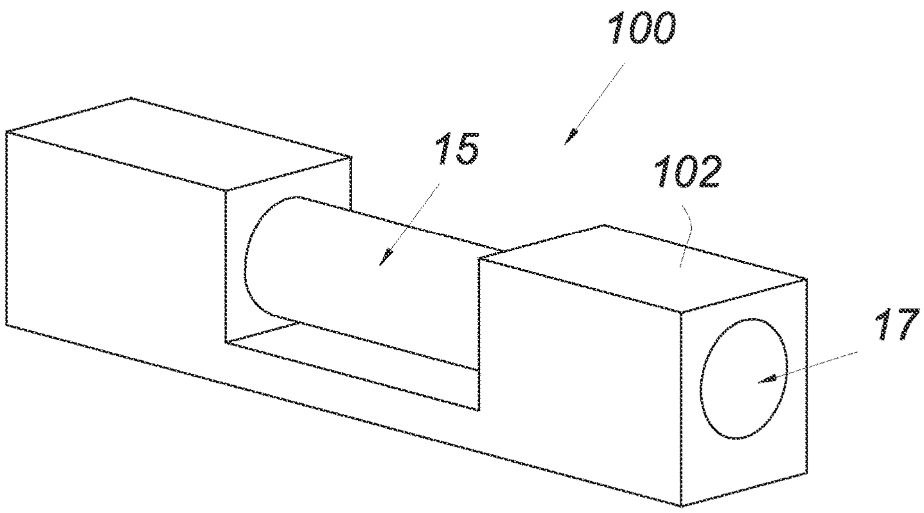
FIG. 5 shows a three-dimensional view of the sight according to FIG. 4.

The sight 100 according to FIG. 4 and FIG. 5 has a lighting element 13 according to a fourth exemplary embodiment, which is inserted into a metal housing 102 of the sight 100. It is also conceivable, however, for the lighting element 1, 2, or 3 to be inserted instead of the lighting element 13. The lighting element 13 is bonded to the metal housing 102 across an area with the aid of adhesive 109.

Here, too, the fourth plastic housing 15 of the lighting element 13 also partially encloses the gaseous tritium light source 4, which is glued in a recess 16 on the circumference surface 15*a* of the plastic housing 15 with the aid of an additional adhesive 110. At the end 15*b* of the plastic housing 15, this forms a see-through region 17 for providing a view of the gaseous tritium light source 4. The fourth plastic housing 15 is made of a transparent plastic based on polyamide 12 (PA12), namely PA 12/MACMI. It is also conceivable for a transparent PC-based plastic to be injection molded.

The sight 100 is provided on a barrel 104 of the firearm 101, as schematically depicted in FIG. 4.

The selection of the polyamide 12 (PA12)-based or PC-based plastic for the various plastic housings 5, 6, 7, 15 yields a high mechanical ruggedness, high temperature resistance of up to 120° C. (degrees Celsius), and a chemical resistance.

The plastic housing 5, 6, 7, 15 according to the invention also passes the environmental test according to NUREG (NUREG 1556, Vol. 8, Rev. 1, Appendix D). This NUREG test tests the environmental conditions of the lighting elements 1, 2, 3, 13 during its use for sights 100 and in so doing, subjects the plastic housing 5, 6, 7, 15 to tests of resistance to dry heat at 120° C., moist heat at 42° C. with 100% humidity, cold at −46° C., temperature shock cycles (−46° C. to 80° C.), vibrations, pressure, mechanical shock (drop test), firing test with 5000 rounds, and penetration. In addition, tests for leaks and chemical resistance (e.g.: to gun cleaning compound) were performed.

The testing of the lighting elements 1, 2, 3, 13 with the plastic housings 5, 6, 7, 15 according to the invention was thus carried out in relation to cleaning compounds according to the specification MIL-C-372B of (NUREG 1556, Vol. 8, Rev. 1, Appendix D, 3.3.2.1 Chemical). This requirement was adapted to current practice, i.e. the carcinogenic and thus prohibited agent chloroform was replaced with the conventional substances listed below. The resistance of the lighting element 1, 2, 3, 13 was tested by immersing it for forty-eight hours at room temperature in each of the following substances: Cleaning compounds, gun oils, and products containing combinations thereof:

MIL-C-372B
Neoval Ultra-Clean
Ballistol Oil
Hoppe's Black No. 9 gun cleaner
Hoppe's Black No. 9 copper cleaner
Hoppe's Black No. 9 Gun Oil
Lucas Oil CLP Extreme Duty
CLP-4 Break Free
Brunox gun care spray
Robla, Solo MIL barrel cleaner
Neoval oil spray and the following agents:

diesel gasoline (kerosene)

5% sodium chloride insect repellents

The illuminants 1, 2, 3, 13 with the plastic housings 5, 6, 7, 15 according to the invention passed all of these tests.

The invention claimed is:

1. A lighting element for a firearm or sight, comprising:

a gaseous tritium light source; and an injection-molded plastic housing that at least partially encloses the gaseous tritium light source, wherein the plastic housing at least partially consists of a polyamide 12 (PA12)-based or polycarbonate (PC)-based transparent plastic.

2. The lighting element according to claim 1, wherein the polyamide 12 (PA12) base is selected from the group consisting of PA 12/MACMI, PA MACMI/MACMT/12, and PA12 GF30 as well as mixtures or blends of one or more of these plastics.

3. The lighting element according to claim 1, wherein the polycarbonate (PC) base is selected from the "PC-HT" group as well as mixtures or blends of one or more of these plastics.

4. A sight comprising the lighting element according to claim 1.

5. The lighting element according to claim 1, wherein a first end of the plastic housing forms an optical lens.

6. The lighting element according to claim 5, wherein the lens is plano-convex, convex-convex, or concave-convex.

7. The lighting element according to claim 5, wherein an inner radius of the lens and an outer radius of the lens are different from each other.

8. The lighting element according to claim 1, wherein a first end of the plastic housing has an optical lens, and the lens is injection-molded onto the plastic housing or the plastic housing is injection-molded onto the lens using a 2-component injection-molding process.

9. The lighting element according to claim 8, wherein the lens is plano-convex, convex-convex, or concave-convex.

10. The lighting element according to claim 8, wherein an inner radius of the lens and an outer radius of the lens are different from each other.

11. The lighting element according to claim 10, wherein the inner radius and/or the outer radius is/are in a range from 1.25 to 4 times half of a diameter of the gaseous tritium light source.

12. The lighting element according to claim 1, wherein the plastic has pigments, and the pigments are selected from the group consisting of color pigments, luminous pigments, fluorescent pigments, phosphorescent pigments, and combinations thereof.

13. The lighting element according to claim 1, wherein the gaseous tritium light source is integrally bonded to the plastic housing with an adhesive.

14. The lighting element according to claim 13, wherein the adhesive is white.

15. The lighting element according to claim 1, wherein the gaseous tritium light source has a hermetically sealed glass tube as its outer shell.

16. The lighting element according to claim 1, wherein the injection-molded plastic housing is elongated.

17. The lighting element according to claim 1, wherein a see-through region of the plastic housing at least partially consists of the polyamide 12 (PA12)-based or polycarbonate (PC)-based plastic.

18. A firearm comprising the lighting element according to claim 1.

19. A firearm comprising the sight according to claim 4.

* * * * *